(12) United States Patent
Doddaiah et al.

(10) Patent No.: US 11,971,858 B2
(45) Date of Patent: Apr. 30, 2024

(54) COMPRESSION OF SNAPSHOT METADATA ON COLD STORAGE VOLUMES

(71) Applicant: DELL PRODUCTS L.P., Hopkinton, MA (US)

(72) Inventors: Ramesh Doddaiah, Westborough, MA (US); Sandeep Chandrashekhara, Shrewsbury, MA (US)

(73) Assignee: DELL PRODUCTS L.P., Hopkinton, MA (US)

( * ) Notice: Subject to any disclaimer, the term of this patent is extended or adjusted under 35 U.S.C. 154(b) by 0 days.

(21) Appl. No.: 17/903,087

(22) Filed: Sep. 6, 2022

(65) Prior Publication Data

US 2024/0078213 A1    Mar. 7, 2024

(51) Int. Cl.
| | | |
|---|---|---|
| *G06F 16/174* | (2019.01) | |
| *G06F 11/14* | (2006.01) | |
| *G06F 16/11* | (2019.01) | |
| *G06F 16/178* | (2019.01) | |

(52) U.S. Cl.
CPC ...... *G06F 16/1744* (2019.01); *G06F 11/1458* (2013.01); *G06F 16/128* (2019.01); *G06F 16/178* (2019.01); *G06F 2201/84* (2013.01)

(58) Field of Classification Search
CPC .. G06F 16/1744; G06F 16/178; G06F 16/128; G06F 11/1458; G06F 2201/84
USPC ........................................................ 707/649
See application file for complete search history.

(56) References Cited

U.S. PATENT DOCUMENTS

| | | | | |
|---|---|---|---|---|
| 8,359,491 | B1 * | 1/2013 | Bloomstein | G06F 11/2023 714/6.3 |
| 2012/0150804 | A1 * | 6/2012 | Adkins | G06F 16/1865 707/639 |
| 2013/0067181 | A1 * | 3/2013 | Boldyrev | G06F 11/1458 711/E12.103 |
| 2022/0221988 | A1 * | 7/2022 | Vankamamidi | G06F 3/0605 |
| 2023/0168970 | A1 * | 6/2023 | Pradhan | G06F 11/1461 707/654 |

OTHER PUBLICATIONS

Borja, Benjur Emmanuel L. and Ventura, Maria Eloisa M. Chapter 1: AutoRegressive Integrated Moving Average (ARIMA). Published 2020. Accessed Sep. 30, 2023 from <https://phdinds-aim.github.io/time_series_handbook/01_Auto RegressiveIntegratedMovingAverage/01_Auto RegressiveIntegratedMovingAverage.html> (Year: 2020).*

* cited by examiner

*Primary Examiner* — Robert W Beausoliel, Jr.
*Assistant Examiner* — Lauren Zannah Ganger
(74) *Attorney, Agent, or Firm* — Anderson Gorecki LLP (57) ABSTRACT

Targetless snapshots of a storage object are characterized in terms of likelihood of access using time-series analysis. Metadata of replication data structures of individual targetless snapshots is maintained in either uncompressed or compressed form based on the characterization of the targetless snapshot. Metadata is compressed at the page level, with same-pages of all replication data structures of cold snapshots of a storage object being compressed together. Compressed pages of targetless snapshot metadata are maintained of storage devices selected based on storage device performance and the time-series characterization of the targetless snapshot.

20 Claims, 8 Drawing Sheets

COMPRESSION OF SNAPSHOT METADATA ON COLD STORAGE VOLUMES

TECHNICAL FIELD

The subject matter of this disclosure is generally related to maintenance of targetless snapshots.

BACKGROUND

High-capacity data storage systems maintain large storage objects that are used by instances of host applications running on host servers. A storage area network (SAN), for example, includes a network of interconnected compute nodes that manage access to host application data stored on arrays of drives. The compute nodes respond to input-output (IO) commands generated by the host servers on behalf of the host applications. Examples of host applications may include, but are not limited to, software for email, accounting, manufacturing, inventory control, and a wide variety of other business processes. Such storage systems implement replication to avoid data loss and enable storage object state to be restored to an earlier point in time. Replication can be accomplished by generating snapshots of storage objects. Snapshots, often referred to as snaps, are incremental copies that represent the changes made to the storage object since some prior point in time, which is usually since the creation of the most recent snap of the storage object. Snaps are smaller in size than complete copies, so snap generation is faster and requires less resources than generation of a complete copy, which is advantageous because it may be desirable to generate frequent snaps of a storage object.

Standard snapshots are created by writing data to a snap volume. A new snap volume is created periodically, and "original" data that has changed since the most recent snapshot is written to the new snap volume as a target device. Each snap volume represents a single snapshot of a single prior point in time. Snap volumes can be mounted like other storage devices, which enables snapshots to be easily accessed by the host servers and host applications. However, creating snap volumes requires generation of volume metadata and use of memory, non-volatile storage space, and potentially network bandwidth because the original data must be written to the snap volume.

"Targetless snapshots" do not require writing original data to a snap volume. Rather, targetless snapshots are created by generating metadata that references the original data in situ. For example, metadata such as pointers can be created in replication data structures such as tables to map to the original changed data on local drives. Because a single targetless snap can represent a prior state of a storage object with just a replication data structure and the referenced in situ data, targetless snapshots advantageously require fewer resources to create and maintain than standard volume-based snapshots.

SUMMARY

All examples, aspects and features mentioned in this document can be combined in any technically possible way.

In accordance with some implementations, a method comprises: generating a plurality of targetless snapshots of a storage object, each of the targetless snapshots representing a different point in time and comprising original data and a replication data structure with metadata that maps the original data to the storage object; characterizing each of the targetless snapshots into one of a plurality of categories based on likelihood of access; and compressing the metadata of the targetless snapshots of at least one of the categories.

In accordance with some implementations, an apparatus comprises: a plurality of non-volatile managed drives; a plurality of compute nodes configured to access the managed drives and maintain a storage object with data; and a targetless snapshot manager configured to: generate a plurality of targetless snapshots of the storage object, each of the targetless snapshots representing a different point in time and comprising original data and a replication data structure with metadata that maps the original data to the storage object; characterize each of the targetless snapshots into one of a plurality of categories based on likelihood of access; and compress the metadata of the targetless snapshots of at least one of the categories.

In accordance with some implementations, a non-transitory computer-readable storage medium stores instructions that when executed by a computer cause the computer to perform a method comprising: generating a plurality of targetless snapshots of a storage object, each of the targetless snapshots representing a different point in time and comprising original data and a replication data structure with metadata that maps the original data to the storage object; characterizing each of the targetless snapshots into one of a plurality of categories based on likelihood of access; and compressing the metadata of the targetless snapshots of at least one of the categories.

Other aspects, features, and implementations will be apparent in view of the detailed description and figures.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. Some aspects, features, and implementations described herein may include machines such as computers, electronic components, optical components, and processes such as computer-implemented procedures and steps. It will be apparent to those of ordinary skill in the art that the computer-implemented procedures and process steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
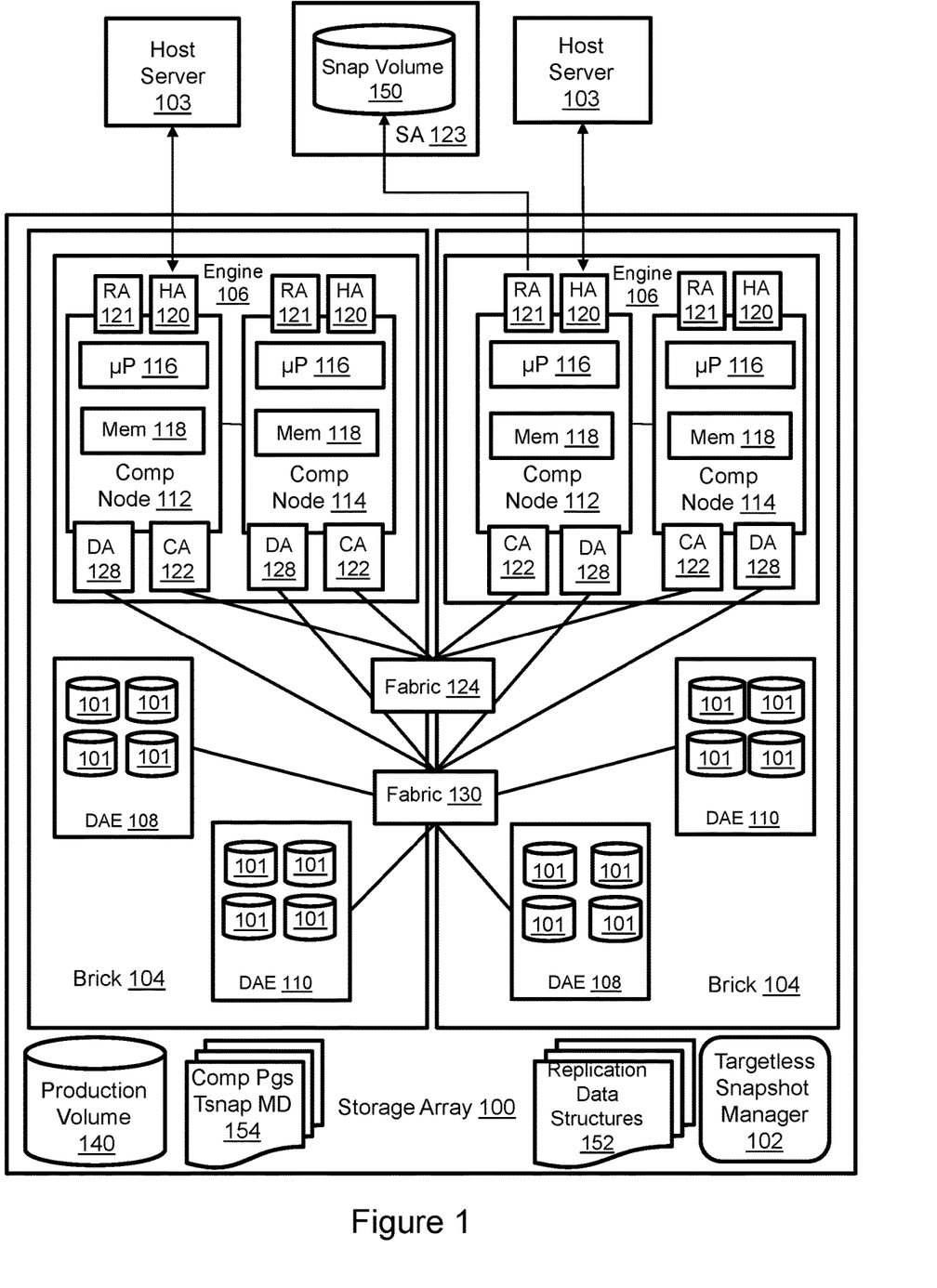
FIG. 1 illustrates a storage array with a targetless snapshot manager that compresses pages of cold targetless snapshot metadata.

FIG. 1 illustrates a storage array 100 with a targetless snapshot manager 102 that compresses cold targetless snapshot metadata. An aspect of maintaining targetless snapshots is the need to store replication data structures 152 on the storage array. Each targetless snapshot requires a replication data structure, which is typically maintained in volatile memory or high-performance non-volatile storage. If the storage array is configured with many storage objects and those storage objects are frequently snapped, then resource utilization to maintain the corresponding replication data structures can become significant. As will be discussed in greater detail below, replication data structures of targetless snapshots that are unlikely to be accessed, aka "cold" snaps, are identified, compressed, and stored in the compressed state on non-volatile drives characterized by a performance level corresponding to snap coldness. Compression may be performed at the page level. The replication data structures 152 may be organized into pages of metadata corresponding to ranges of logical block addresses (LBAs) of the snapped storage object, e.g., production volume 140. Same-pages of all replication data structures from all cold snaps of the same storage object may be compressed together to generate compressed pages of targetless snapshot metadata 154. Consequently, it isn't necessary to decompress a complete targetless snapshot replication data structure to access data associated with only a single page of targetless snapshot metadata.

A storage array is just one example of a platform on which the inventive concepts can be implemented. The illustrated storage array 100 includes one or more bricks 104. Each brick includes an engine 106 and one or more disk array enclosures (DAEs) 108, 110. Each engine 106 includes a pair of interconnected compute nodes 112, 114 that are arranged in a failover relationship with mirrored local memory 118 and may be referred to as "storage directors." Although it is known in the art to refer to the compute nodes of a SAN as "hosts," that naming convention is avoided in this disclosure to help distinguish the host servers 103 from the compute nodes 112, 114. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with the host servers 103. Each host adapter has resources for servicing input-output commands (IOs) from the host servers. The host adapter resources may include processors, volatile memory, and ports via which the hosts may access the storage array. Each compute node also includes a remote adapter (RA) 121 for communicating with other storage systems, e.g., for remote mirroring, backup, and replication. Each compute node also includes one or more disk adapters (DAs) 128 for communicating with the managed drives 101 in the DAEs. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. Disk controllers may be associated with the managed drives as is known in the art. An interconnecting fabric 130 enables all disk adapters to communicate with all managed drives. The managed drives 101 include non-volatile storage media that may be of any type, e.g., solid-state drives (SSDs) based on EEPROM technology such as NAND and NOR flash memory and hard disk drives (HDDs) with spinning disk magnetic storage media.

The managed drives 101 are not discoverable by the host servers 103, but the storage array 100 creates and presents storage objects such as production volume 140 that can be discovered by the host servers. Without limitation, storage objects may be referred to as storage or data devices, volumes, or LUNs, where a logical unit number (LUN) is a number used to identify logical storage volumes in accordance with the small computer system interface (SCSI) protocol. Storage objects that can be discovered and accessed by the host servers are identified by the term "production," e.g., a production volume, production device, or production LUN. From the perspective of the host servers, each production storage object is a single drive having a set of contiguous logical block addresses (LBAs) on which data used by the instances of a host application resides. However, the host application data is stored at non-contiguous addresses on various managed drives 101. A storage group containing multiple production storage objects may be created for the instances of an individual host application. Multiple instances of a single host application may use data from the same storage group, but instances of different host applications generally do not use data from the same storage group. The storage array may maintain a large number of production storage objects and storage groups. Host application data associated with a standard volume-based snapshot is written to a snap volume 150, which may be local or remote, e.g., on storage array 123.

Figure 2:
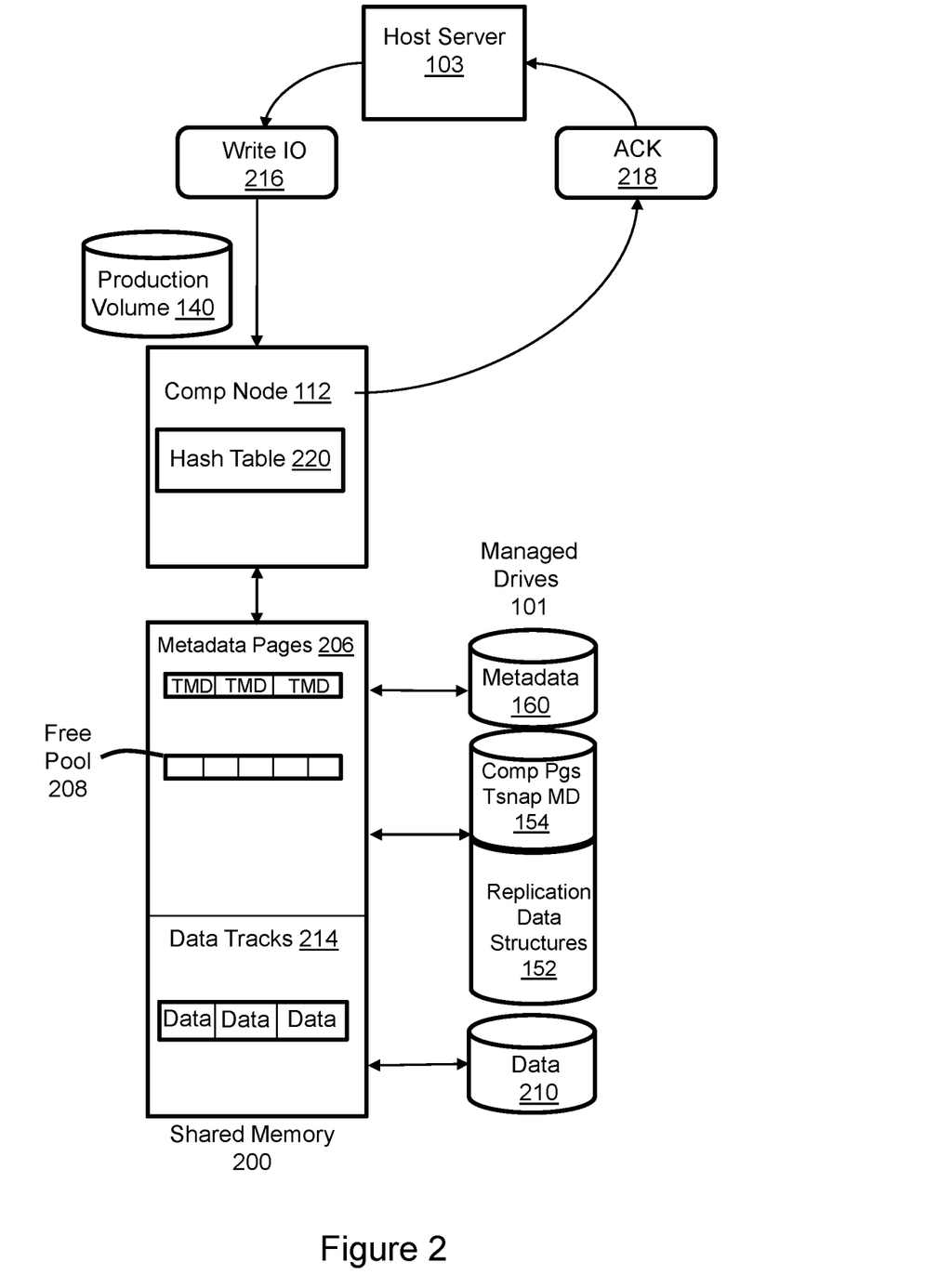
FIG. 2 illustrates how host application data is accessed by the storage array.

Referring to FIGS. 1 and 2, the compute nodes 112, 114 maintain metadata 160 that maps between the LBAs of production storage objects such as production volume 140 and physical addresses on the managed drives 101 in order to process IOs from the host servers. The basic IO allocation unit of storage capacity that is used by the compute nodes 112, 114 to access the managed drives 101 is a back-end track (BE TRK). The host application data is logically stored in front-end tracks (FE TRKs) at LBAs on the production volume. As previously mentioned, each compute node dedicates a portion or partition of its respective local memory to a logical shared memory 200 that can be accessed by other compute nodes of the storage array via DMA. A complete record of all metadata 160 of the current state of all storage objects including the production volume 140 can be maintained in the shared memory or maintained on a highest-performance pool of the managed drives 101 and paged-in to shared memory as needed. A metadata pages 206 portion of the shared memory 200 is dedicated for holding selected pages of track metadata (TMD) that indicates, among other things, where associated tracks of storage object data are located in the shared memory 200 and managed drives 101. A free pool 208 of empty address space that does not contain pages of metadata facilitates efficient page-in of metadata from the managed drives. Pages of track metadata may be evicted from the first portion of the shared memory in page-out operations, e.g., moved to the managed drives 101 if the page has been updated in the shared memory, thereby increasing the size of the free pool 208. A data tracks 214 portion of the shared memory 200 is dedicated for temporarily holding selected tracks of host application data. For example, tracks of data that are required to process IOs to production volume 140 are copied into the data tracks portion of the shared memory and tracks of data that are no longer required are destaged to the managed drives or, alternatively, flushed from the shared memory if the track data in the shared memory is redundant with the corresponding track data on the managed drives. In response to an IO command 216 sent by a host server 103 to write data to the production volume 140, a compute node 112 uses a hash table 220 to obtain the page numbers of the track metadata associated with the LBAs being written. Specifically, the device number, cylinder number, head, and size specified in the IO command are inputted to the hash table. The page numbers resulting from the lookup are used to find corresponding pages of track metadata in the metadata pages 206. The TMDs in those pages are used to find and obtain the corresponding tracks of data in the data tracks 214, or in the managed drives 101 from where it is copied into the data tracks. When the data being written is copied into the data tracks and the TMDs have been updated, then an ACK 218 is sent from the compute node 112 to the host server 103 to indicate that the IO 216 has been processed. The updated metadata pages and data tracks are subsequently destaged to the managed drives 101 in the background.

Uncompressed targetless snapshots can be accessed by the storage array using the replication data structures. The replication data structures 152 of uncompressed targetless snapshots are stored in memory or on the highest performance pools of the managed drives 101. In order to access an uncompressed targetless snapshot for which the replication data structure is stored on the managed drives, the replication data structure is copied from the managed drives into the metadata pages of the shared memory and used to locate the data associated with the targetless snapshot. That data can then be copied from the managed drives into the data tracks. Replication data structures of cold targetless snapshots are stored in a compressed state on less costly pools of the managed drives. Maintenance and access to the compressed pages of targetless snapshot metadata will be explained below. Another technique is to create a snap volume with targetless snap data so that the volume can be mounted in a standard manner.

Figure 3:
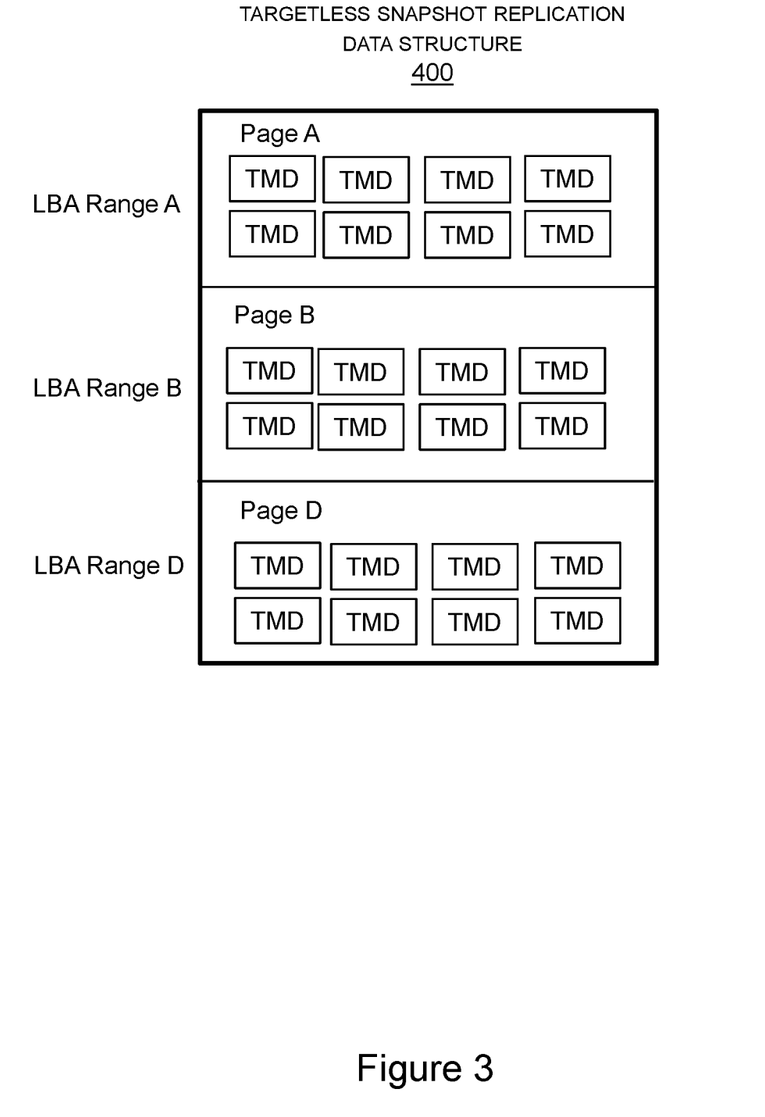
FIG. 3 illustrates a targetless snapshot replication data structure in greater detail.

FIG. 3 illustrates a targetless snapshot replication data structure 400 in greater detail. The targetless snapshot replication data structure includes TMD such as tables with pointers that map a storage object to tracks of data on the managed drives and vice versa. The TMDs may be organized into page groupings associated with ranges of LBAs of the storage object. For example, the TMDs at LBA range A may be grouped together on page A. The replication data structure includes only those pages associated with tracks that changed since generation of the most recent targetless snapshot of the storage object, so not all LBA ranges of the storage object are necessarily present in every replication data structure.

Figure 4:
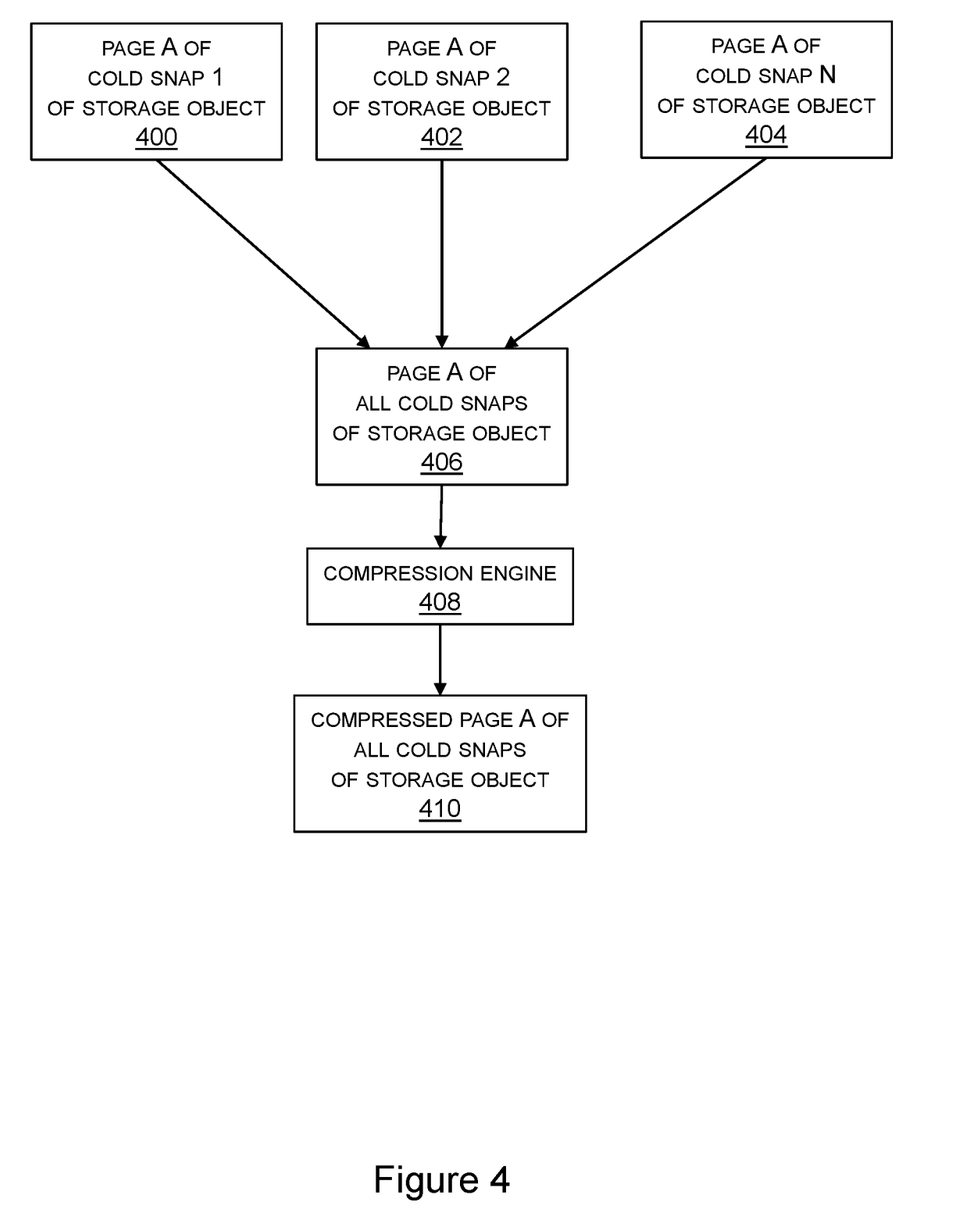
FIG. 4 illustrates generation of a compressed page of targetless snapshot metadata.

FIG. 4 illustrates generation of a compressed page of targetless snapshot metadata. Compression is performed at the page level. All same-pages of cold targetless snapshots are compressed together, exclusive from other pages of the cold targetless snapshots. In the illustrated example, Page A of cold targetless snapshots 1 through N 400, 402, 404 are combined, e.g., concatenated, to generate Page A of all cold targetless snapshots of the storage object 406. The combined Page A of all cold targetless snapshots of the storage object 406 is processed by compression engine 408 to yield compressed page A of all cold targetless snapshots of the storage object 410. Other same-pages, e.g., Page B, Page C, etc., of cold targetless snapshots of the storage object are similarly combined and compressed such that the compression domain of each compressed record is a single page of a single storage object.

Figure 5:
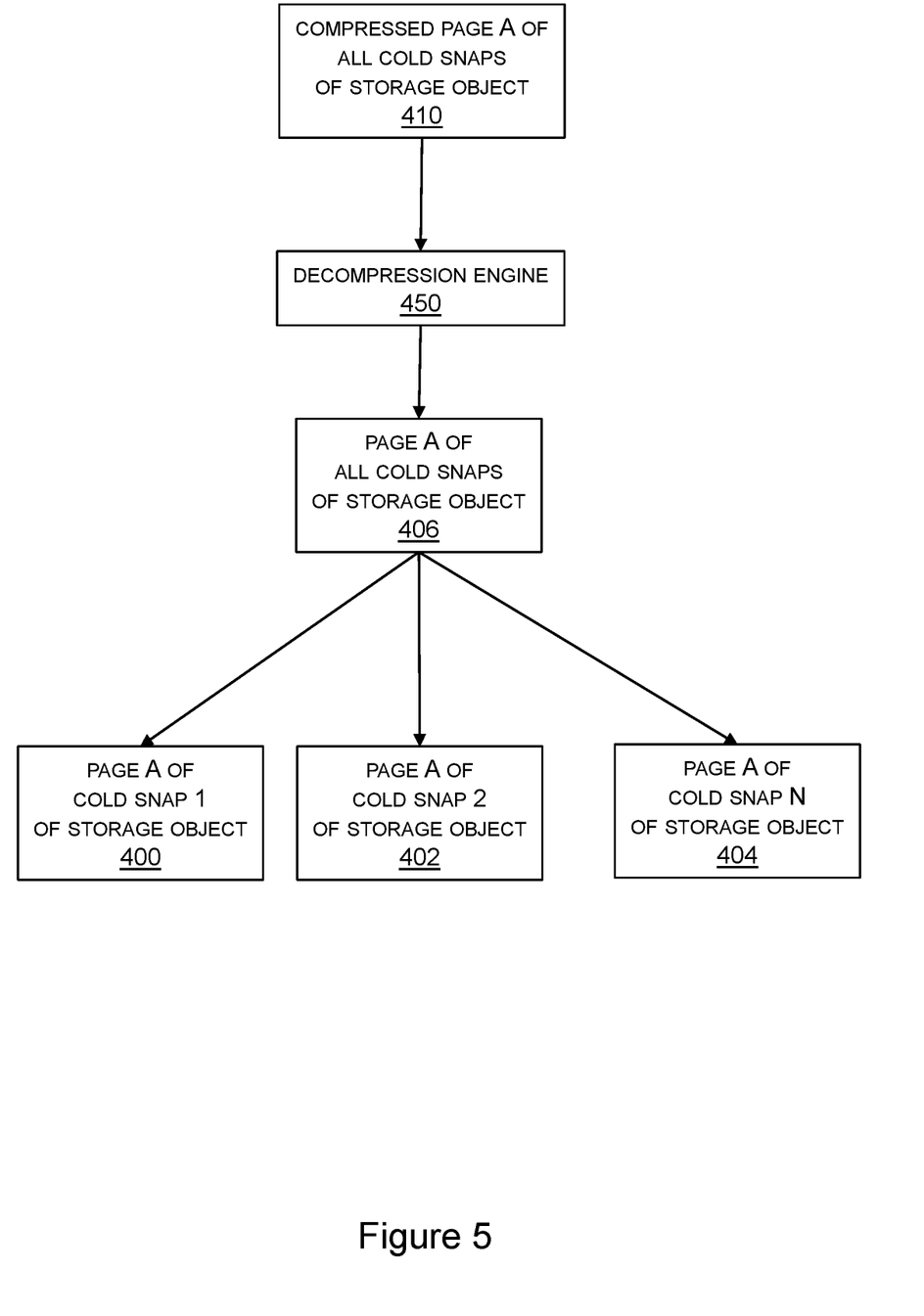
FIG. 5 illustrates decompression of the compressed page of targetless snapshot metadata.

FIG. 5 illustrates decompression of the compressed page of targetless snapshot metadata. All same-pages of cold targetless snapshots are decompressed together, exclusive from other pages of the cold targetless snapshots. In the illustrated example, Page A of each of the cold targetless snapshots 1 through N 400, 402, 404 are recovered by decompressing the compressed page A of all cold targetless snapshots of the storage object 410 with decompression engine 450 to obtain the combined Page A of all cold targetless snapshots of the storage object 406, which is separated into the individual A Pages of cold targetless snapshots 1 through N 400, 402, 404. Other same-pages, e.g., Page B, Page C, etc., of cold targetless snapshots of the storage object are similarly de-compressible such that the decompression domain of each compressed record is a single page of a single storage object.

Figure 6:
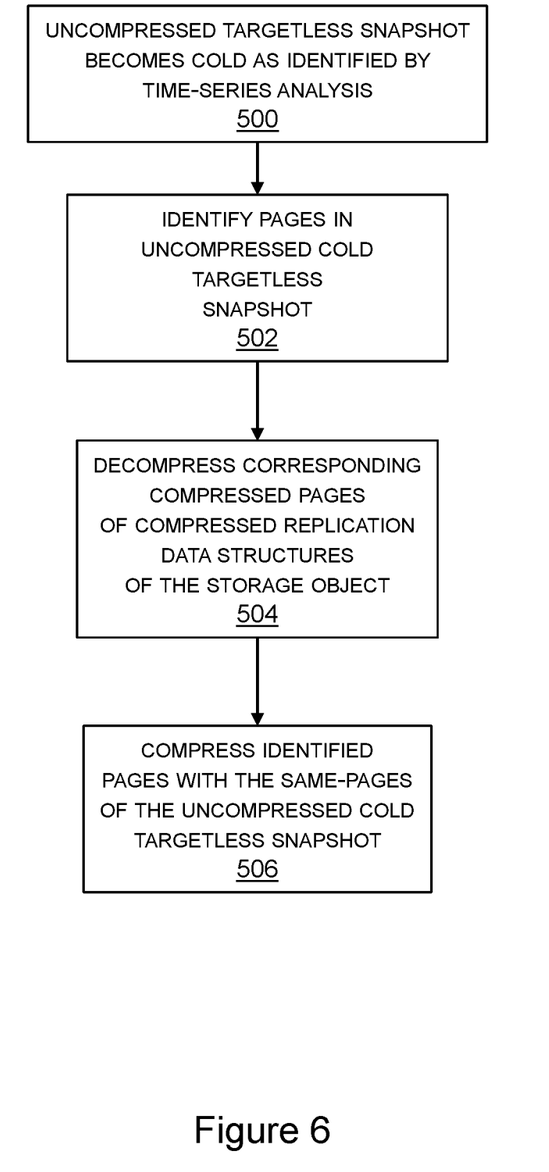
FIG. 6 illustrates addition of a new cold targetless snapshot to compressed pages of targetless snapshot metadata.

FIG. 6 illustrates addition of a new cold targetless snapshot to compressed pages of targetless snapshot metadata. When an uncompressed targetless snapshot becomes cold as identified by time-series analysis in step 500, then the pages present in the replication data structure are identified as indicated in step 502. For example, the replication data structure might include only pages A, B, and D even though the storage object includes LBAs corresponding to pages A through Z because only data in pages A, B, and D has changed since the most recent snap. The corresponding compressed pages of compressed replication data structures of the storage object are obtained and decompressed as indicated in step 504. For example, compressed page A of all cold targetless snapshots of the storage object would be decompressed to recover all the A Pages of cold targetless snapshots 1 through N of the storage object. Pages B and D of cold targetless snapshots 1 through N of the storage object are recovered similarly. The identified pages of the newly cold targetless snapshot are then compressed with the recovered same pages. For example, Page A of the newly cold targetless snapshot is compressed with the other instances of Page A of all other cold targetless snapshots of the storage object. Advantageously, only those pages that are present in the newly cold targetless snapshot need to be decompressed and compressed with the pages that are present in the newly cold targetless snapshot.

Figure 7:
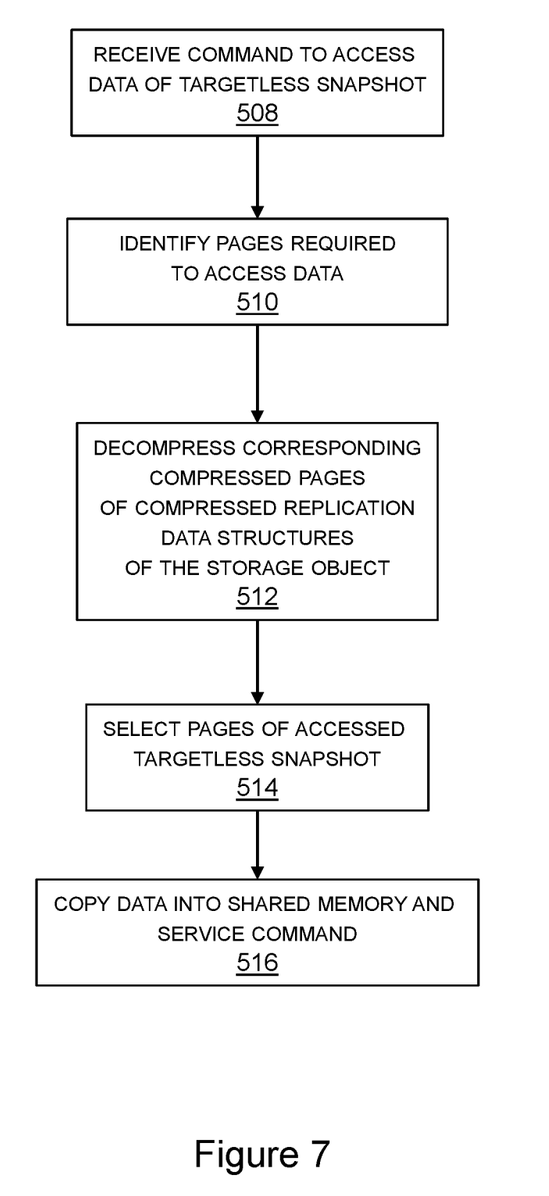
FIG. 7 illustrates accessing data from a targetless snapshot.

FIG. 7 illustrates accessing data from a targetless snapshot. Responsive to receipt of a command to access data of a targetless snapshot as indicated in step 508, the pages required to access the data are identified in step 510. The corresponding compressed pages are decompressed as indicated in step 512. Step 512 yields corresponding same-pages from all cold targetless snapshots of the storage object. The pages of the targetless snapshot being accessed are selected in step 514. The metadata in the selected pages is used to access the data as indicated in step 516. Advantageously, not all the pages of the accessed targetless snapshot need to be recovered.

Figure 8:
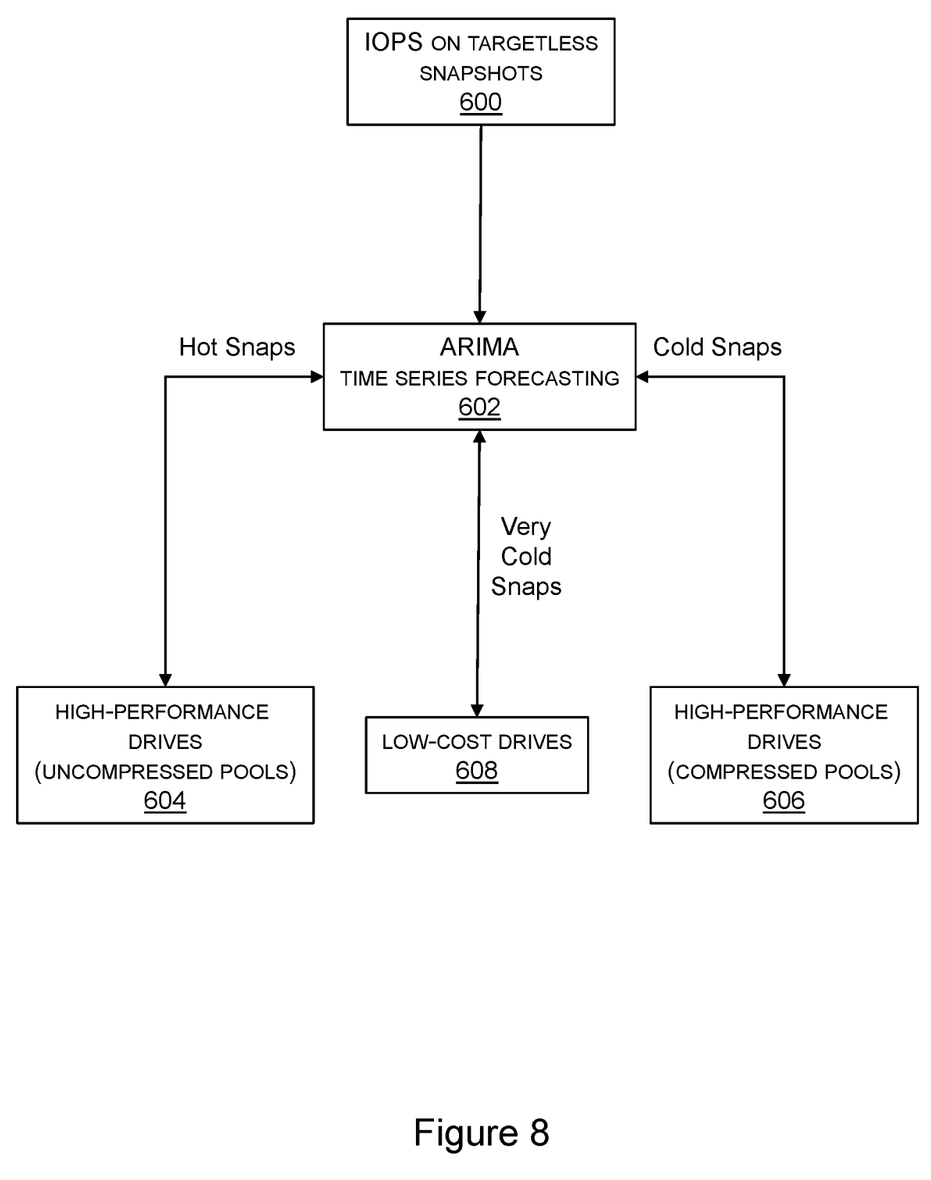
FIG. 8 illustrates aspects of maintenance of targetless snapshots.

FIG. 8 illustrates aspects of maintenance of targetless snapshots. IOPS loading on targetless snapshots is tracked in step 600. Autoregressive integrated moving average (ARIMA) forecasting 602 is performed to characterize individual targetless snapshots of individual storage objects as being hot, cold, or very cold based on tracked IOPS and age. Recent high IOPS access may correlate with snaps being hot, recent low IOPS access may correlate with snaps being cold, and low IOPS access and age may correlate with snaps being very cold, e.g., with cold snaps that are greater than 60 days old being considered very cold. Hot snap metadata is stored in an uncompressed state on uncompressed pools 604 of high-performance drives such as special MDP (flash) devices. Cold snap metadata is stored in a compressed state on compressed pools 606 of the high-performance drives. Very cold snap metadata is stored on low-cost drives 608 such as generic flash drives. Snap characterizations can change over time so snap state is updated and snapshot metadata is moved between pools/drives in accordance with current characterization.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
generating a plurality of targetless snapshots of a storage object, each of the targetless snapshots characterized by:
being volume-less;
residing in volatile memory;
being represented by metadata comprising a table of pointers that map between the storage object and locations of original data that has been updated since generation of a most recent targetless snapshot of the storage object; and
representing a different point in time;
characterizing each of the targetless snapshots into one of a plurality of categories based on likelihood of access; and
compressing the tables of the targetless snapshots of at least one of the categories.

2. The method of claim 1 further comprising characterizing each of the targetless snapshots into one of the plurality of categories using time-series forecasting.

3. The method of claim 2 further comprising performing autoregressive integrated moving average forecasting based on input-output operations per second.

4. The method of claim 1 further comprising selecting a storage pool on which to store the metadata based on the characterization of the targetless snapshot and performance of the storage pool.

5. The method of claim 4 further comprising relocating the metadata to a different storage pool with a different performance based on the characterization of the targetless snapshot changing to a different characterization.

6. The method of claim 1 further comprising separately compressing groups of same-pages of the metadata of the targetless snapshots.

7. The method of claim 6 further comprising compressing a first replication data structure by identifying pages in the first replication data structure; decompressing matching groups of same-pages of the metadata of the targetless snapshots; and compressing metadata of the identified pages in the first replication data structure with the same-pages of the metadata of the targetless snapshots.

8. An apparatus comprising:
a plurality of non-volatile managed drives;
a plurality of compute nodes configured to access the managed drives and maintain a storage object with data; and
a targetless snapshot manager configured to:
generate a plurality of targetless snapshots of the storage object, each of the targetless snapshots characterized by:
being volume-less;
residing in volatile memory;
being represented by metadata comprising a table of pointers that map between the storage object and locations of original data that has been updated since generation of a most recent targetless snapshot of the storage object; and
representing a different point in time;
characterize each of the targetless snapshots into one of a plurality of categories based on likelihood of access; and
compress the tables of the targetless snapshots of at least one of the categories.

9. The apparatus of claim 8 further comprising the targetless snapshot manager being configured to characterize each of the targetless snapshots into one of the plurality of categories using time-series forecasting.

10. The apparatus of claim 9 further comprising the targetless snapshot manager being configured to perform autoregressive integrated moving average forecasting based on input-output operations per second.

11. The apparatus of claim 8 further comprising the targetless snapshot manager being configured to select a storage pool on which to store the metadata based on the characterization of the targetless snapshot and performance of the storage pool.

12. The apparatus of claim 11 further comprising the targetless snapshot manager being configured to relocate the metadata to a different storage pool with a different performance based on the characterization of the targetless snapshot changing to a different characterization.

13. The apparatus of claim 8 further comprising the targetless snapshot manager being configured to separately compress groups of same-pages of the metadata of the targetless snapshots.

14. The apparatus of claim 13 further comprising the targetless snapshot manager being configured to compress a first replication data structure by identifying pages in the first replication data structure; decompressing matching groups of same-pages of the metadata of the targetless snapshots; and compressing metadata of the identified pages in the first replication data structure with the same-pages of the metadata of the targetless snapshots.

15. A non-transitory computer-readable storage medium storing instructions that when executed by a computer cause the computer to perform a method comprising:
generating a plurality of targetless snapshots of a storage object, each of the targetless snapshots characterized by:
being volume-less;
residing in volatile memory;

being represented by metadata comprising a table of pointers that map between the storage object and locations of original data that has been updated since generation of a most recent targetless snapshot of the storage object; and representing a different point in time;

characterizing each of the targetless snapshots into one of a plurality of categories based on likelihood of access; and compressing the tables of the targetless snapshots of at least one of the categories.

16. The non-transitory computer-readable storage medium of claim 15 in which the method further comprises characterizing each of the targetless snapshots into one of the plurality of categories using time-series forecasting.

17. The non-transitory computer-readable storage medium of claim 16 in which the method further comprises performing autoregressive integrated moving average forecasting based on input-output operations per second.

18. The non-transitory computer-readable storage medium of claim 15 in which the method further comprises selecting a storage pool on which to store the metadata based on the characterization of the targetless snapshot and performance of the storage pool.

19. The non-transitory computer-readable storage medium of claim 18 in which the method further comprises relocating the metadata to a different storage pool with a different performance based on the characterization of the targetless snapshot changing to a different characterization.

20. The non-transitory computer-readable storage medium of claim 15 in which the method further comprises separately compressing groups of same-pages of the metadata of the targetless snapshots.

* * * * *